US005647006A

United States Patent [19]
Martin

[11] Patent Number: 5,647,006
[45] Date of Patent: Jul. 8, 1997

[54] MOBILE RADIO TERMINAL COMPRISING A SPEECH

[75] Inventor: Rainer Martin, Aachen, Germany

[73] Assignee: U.S. Philips Corporation, New York, N.Y.

[21] Appl. No.: 493,401

[22] Filed: Jun. 22, 1995

[30] Foreign Application Priority Data

Jun. 22, 1994 [DE] Germany .............................. 44 21 853

[51] Int. Cl.[6] .............................. H04B 3/20; H04B 15/00

[52] U.S. Cl. .......................... 381/66; 381/71.1; 381/94.1; 379/410; 379/411; 379/392

[58] Field of Search .................................. 381/71, 94, 66; 379/388, 390, 410, 411, 392

[56] References Cited

U.S. PATENT DOCUMENTS

| | | | |
|---|---|---|---|
| 5,126,681 | 6/1992 | Ziegler, Jr. et al. | 381/94 |
| 5,359,663 | 10/1994 | Katz | 381/94 |
| 5,388,160 | 2/1995 | Hashimoto et al. | 381/94 |
| 5,400,399 | 3/1995 | Umemoto et al. | 379/410 |
| 5,473,701 | 12/1995 | Cezanne et al. | 381/92 |
| 5,519,637 | 5/1996 | Mathur | 381/71 |
| 5,526,426 | 6/1996 | McLaughlin | 379/410 |
| 5,577,127 | 11/1996 | Van Overbeek | 381/94 |
| 5,581,495 | 12/1996 | Adkins et al. | 381/94 |

OTHER PUBLICATIONS

IEEE Transactions on Acoustics, Speech, and Signal Processing, vol. ASSP-29, No. 3, Jun. 1981, pp. 582–587.

*Primary Examiner*—Forester W. Isen
*Attorney, Agent, or Firm*—Arthur G. Schaier

[57] ABSTRACT

A mobile radio terminal comprises a speech processor for processing a first and at least a further speech signal formed by noise and speech signal components and available as sample values. The sampled further speech signal is delayed by an adjustable delay value. Control means are provided which are used for forming gradient estimates. The control means are additionally used for recursively determining delay estimates from the gradient estimates. By rounding the delay estimates, the delay values are formed. Furthermore, their mutually time-shifted speech signals are added together by means of an adder device.

8 Claims, 5 Drawing Sheets

MOBILE RADIO TERMINAL COMPRISING A SPEECH

BACKGROUND OF THE INVENTION

1. Field of the Invention

The invention relates to a mobile radio terminal comprising a speech processor.

2. Discussion of the Related Art

In the field of speech processing, speech signals to be processed often contain noise signal components, which leads to a degradation of the speech quality and thus specifically to a deteriorated understandability. This problem occurs, for example, in mobile radio terminals which are used in private cars and have a hands-free facility. Speech signals received from microphones of the hands-free facility which are installed in the private car contain, on the one hand, speech signal components generated by the user (speech source) of the mobile radio terminal inside the private car, and, on the other hand, noise signal components which consist of other ambient noise and, during a ride, in essence, of engine and driving noise.

"IEEE Transactions on Acoustics, Speech, and Signal Processing, Vol. ASSP-29, No. 3, June 1981, pp. 582–587" has disclosed an arrangement for adaptively estimating time delays of two strongly correlated signals in digital systems. Either signal is delayed by a controllable delay element. The delay values of the delay element are adaptively matched with the correlated signals. Calculating the delay values is effected via an algorithm which has meanwhile been referenced an LMS algorithm (Least Mean Square) by those skilled in the art. This algorithm is based on the minimization of the power i.e. of the squared error values which are obtained from the difference between the delayed and the undelayed signal. The core of the LSM algorithm is the recursive calculation of the delay values via estimates for the gradients of the power of the error values.

To find the error values in the state of the art cited above, the difference between two sample values of two oppositely time-shifted signals is formed while one of the signals is delayed. The appropriate delay value is rounded to an integer multiple of a sampling interval of the signals. During this rounding operation, convergence problems occur because considerable variations of the rounded delay values occur when very small error values are reached. During one sampling interval the delay values then vary between two rounded delay values.

SUMMARY OF THE INVENTION

It is an object of the invention to improve the speech quality of the speech signals to be processed and to reduce convergence problems.

The object is achieved in that the speech processor is provided for processing a first and at least a further speech signal consisting of noise and speech signal components and available as sample values, in that delay means are provided for delaying the sampled further speech signal, in that control means are provided for forming gradient estimates by multiplying error values for two speech signals by the output values of a digital filter, which filter causes a 90° phase shift to occur and is used for filtering one of the two speech signals, for recursively determining delay estimates from the gradient estimates, while the delay values used for setting the delay means are formed from the delay estimates via a rounding operation, and for forming at least one respective error value for a specific sampling instant from the difference between a speech signal estimate which estimate is used for estimating the further speech signal at an instant shifted in time by the delay estimate relative to the specific sampling instant, and is formed by interpolating sample values of the further speech signal and the sample value of another one of the speech signals to be processed at the specific sampling instant, and in that an adder device is provided for adding together the mutually time-shifted speech signals.

The gradient estimates are used for estimating each respective gradient of the power of the error values or, termed differently, of the squared error values. The control means determine the delay estimates, so that the power of the error values is reduced. The convergence of the delay values calculated from the delay estimates is then improved considerably, because in comparison with the delay values the delay estimates have a higher resolution because of the rounding. Variations of the delay values are thus, in essence, avoided. The resolution of the delay values is selected to be smaller compared with the resolution of the delay estimates, in order to minimize the circuitry and expense when the speech signals are delayed. The signal-to-noise ratio and the speech quality of a sum signal available on the output of the adder device are improved compared to the signal-to-noise ratio and the speech quality of the individual speech signals.

In an embodiment of the invention the digital filter is a digital Hilbert transform.

A digital Hilbert transform, which effects a 90° phase shift for all frequencies, has, in terms of absolute values, the transmission function of a low-pass filter, so that especially for the low frequencies which are essential to a speech signal, the rounded delay values converge well. The Hilbert transform may also be replaced, for example, by a differentiator which also effects a 90° phase shift. However, a differentiator has, in terms of absolute values, a linearly rising transfer function, so that especially the low frequencies of a speech signal are suppressed, so that there is not so good a convergence as in the case of a Hilbert transform.

In another embodiment there are provided means for smoothing the gradient estimates.

This provides an improved estimation of the delay estimates.

In a further embodiment the speech processor is provided for processing three speech signals.

Compared with a speech processor for processing not more than two speech signals, the signal-to-noise ratio and the speech quality of the sum signal available on the output of the adder device can be improved in this manner.

The invention may furthermore be embodied in that a linear combination of error values is used for determining a delay estimate for the further speech signal.

In this manner the stability of the speech processor is enhanced.

For a further embodiment of the invention are provided delay means for delaying the first speech signal by a fixed delay time.

Without the delay means effecting a fixed delay, only time shifts between the first and further speech signal(s) can be set that cause the first speech signal to be leading. which microphones are used for converting the acoustic speech signals produced by the speech source into electric speech signals. It should also be possible, however, to set a lagging effect of the first speech signal, which can be simply realised with this arrangement, depending on the position relative to microphones of the speech processor of a speech source which produces the speech signal components.

For a further embodiment of the invention the speech processor is integrated with a hands-free facility.

Especially in hands-free facilities there is a problem that received speech signals contain annoying noise components which deteriorate the signal-to-noise ratio and degrade the speech quality of the speech signals. Especially in mobile radio terminals this problem occurs when they are used in a considerably noisy environment such as, for example, in a motor car.

The implementation of the described invention therefore provides improved communication between the subscribers, especially when the invention is used in hands-free facilities.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
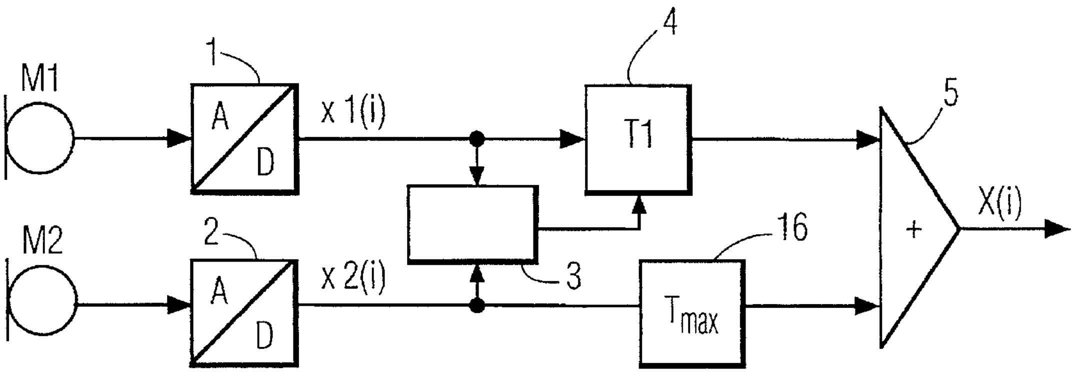
FIG. 1 shows a speech processor for two speech signals.

The speech processor shown in FIG. 1 comprises two microphones M1 and M2. They are used for converting acoustic speech signals to electric speech signals which consist of speech and noise signal components. The speech signal components come from a single speech source (speaker) which customarily has different distances to the two microphones M1 and M2. The speech signal components are thus highly correlated.

The noise signal components of the two speech signals received by the microphones M1 and M2 are not ambient noise produced by the individual speech sources, which sources may be assumed to be uncorrelated or slightly correlated with suitable microphone distances in the range from 10 to 60 cm if the microphones are located in a so-called fading environment such as, for example, in a motor car or in an office. For example, if the speech source and speech processor are located in a private car, the noise signal components are caused especially by engine and driving noises.

The microphone signals produced by the microphones M1 and M2 are digitized by the analog-to-digital converters 1 and 2. The resulting digitized microphone signals thus available as sample values x1(i) and x2(i) are evaluated by a control device 3 which is provided for controlling and setting a delay element 4. The sampled microphone signals x1(i) and x2(i) will be referenced microphone or speech signals for short in the following. The delay element 4 delays the microphone signal x1 by delay values T1 which can be set by the control device 3. An adder 5 adds together the delayed microphone signal x1(i) coming from the delay element 4 and the delayed microphone signal x2(i) coming from a delay element 16 and having a constant time delay $T_{max}$. The delay element 16 has for its task to provide both a leading and a lagging of the microphone signal x1(i) relative to the microphone signal x2(i). A sum signal X(i) available on the output of the adder 5 is a sampled speech signal whose signal-to-noise ratio is increased relative to the signal-to-noise ratios of the speech signals x1(i) and x2(i). A suitable setting of the delay time T1 of the delay element 4 provides that the adder 5 amplifies in its adding operation the power of the speech signal components of the two speech signals x1(i) and x2(i) approximately by a factor of 4 and the power of the noise signal components only approximately by a factor of 2. This yields an improvement of the power-related signal-to-noise ratio of about 3 dB.

Figure 2:
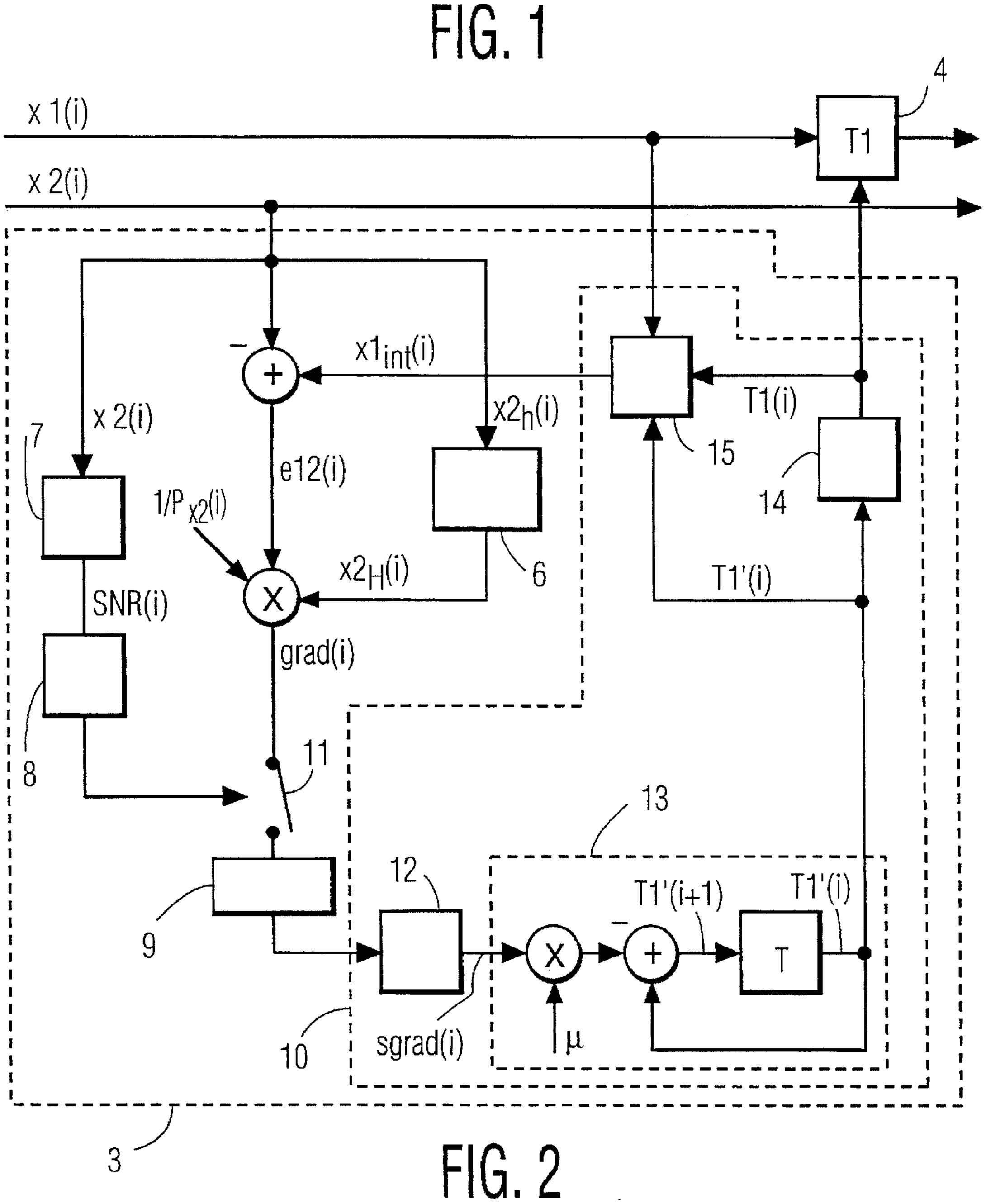
FIG. 2 shows a control device for setting a time shift between the two speech signals shown in FIG. 1.

In FIG. 2 is further explained the operation of the control device 3 by means of a block circuit diagram. Error values $e_{12}(i)$ are produced from the speech signal x2(i) and speech signal estimates $x1_{int}(i)$ by a subtraction according to $$e_{12}(i)=x1_{int}(i)-x2(i) \tag{1}$$

The speech signal estimates $x1_{int}(i)$ are values resulting from an interpolation of sample values of the speech signal x1(i). The way of determining the speech signal estimates $x1_{int}(i)$ will be explained in the following. i is a variable which may assume integer values and by which are indexed, on the one hand, sampling instants of the speech signals x1(i) and x2(i) and, on the other hand, also program cycles of the programmable control device 3 comprising control means, while one new sample value per speech signal is processed in one program cycle.

A digital filter 6 performs a Hilbert transform of the sample values x2(i) by:

$$x2_H(i)=\sum_{k=0}^{K} h(k)*x2(i-k) \tag{2}$$

The digital filter 6 producing the values $x2_H(i)$ from x2(i) is a $K^{th}$-order FIR filter which has coefficients h(0), h(1), . . . , h(K). In the present illustrative embodiment K is equal to sixteen, so that the digital filter 6 has seventeen coefficients. The digital filter 6 has the value-dependent transfer function of a low-pass filter. It further effects a 90° phase shift. The fixed 90° phase shift is the decisive property of the digital filter 6; the variation of the value of the transfer function is not decisive for the operation of the speech processor. For example, the digital filter 6 may also be realised by a differentiator, but this would lead to a suppression of low-frequency components of x2(i) and thus to a reduced efficiency of the speech processor.

The output values $x2_H(i)$ are multiplied by the error values $e_{12}(i)$ and the reciprocal value $1/P_{x2}(i)$ of a short-time power $P_{x2}(i)$, while the short-time power $P_{x2}(i)$ is formed according to $$P_{x2}(i)=P_{x2}(i-1)+[x2(i)]^2-[x2(i-N)]^2 \tag{3}$$

N denotes the number of sample values of x1 playing a role in the calculation. N is, for example, equal to 65. The multiplication by $1/P_{x2}(i)$ is used to avoid instabilities in the control device 3 when the delay element 4 is controlled. The result of $$grad(i)=\frac{1}{P_{x2}(i)}*e(i)*x2_H(i) \tag{4}$$

is an estimated gradient grad(i) of the squares and the power respectively, of the error values $e_{12}(i)$ in the program cycle i normalized to the short-time power $P_{x2}(i)$.

A function block 7 continuously forms estimates SNR(i) of the associated signal-to-noise ratio from the sample values of the speech signal x2(i), which estimates are evaluated by a function block 8. Another option is evaluating the speech signal x1(i) instead of the speech signal x2(i), without the efficiency of the speech processor being restricted. The way of operation of the function block 7 will be further explained with reference to the FIGS. 6 to 8. The function block 8 makes a decision on the threshold of the estimates SNR(i). Only when the estimates SNR(i) lie above a predeterminable threshold is a buffer 9 overwritten by the newly determined gradient estimate grad(i). This case is symbolized by the closed position of a switch 11, which switch is controlled by the function block 8. The memory contents (grad(i)) of the buffer 9 are further processed by a function unit 10. For the case where an estimate SNR(i) lies below the predeterminable threshold, the buffer 9 is not overwritten by the newly determined gradient estimate grad (i) and it retains its former memory contents which is symbolized by the open position of the switch 11. This predeterminable threshold, on which the opening and closing of the switch 11 by the function block 8 depends, lies preferably between 0 and 10 dB.

The buffer 9 supplies the gradient estimates grad(i) stored therein to the function unit 10 which is also supplied with sample values of the speech signal x1(i) and which is used both for supplying the speech signal estimates $x1_{int}(i)$ and for setting the delay element 4.

The gradient estimates grad(i) are processed to smoothed gradient estimates sgrad(i) by a function block 12 according to $$sgrad(i)=\alpha * sgrad(i-1)+(1-\alpha)*grad(i) \qquad (5)$$

α is a constant which has the value 0.95 in the illustrative embodiment. A function block 13 uses the values sgrad(i) for adapting delay estimates T1'(i) according to $$T1'(i+1)=T1'(i)-\mu * sgrad(i) \qquad (6)$$

Thus, the delay estimates T1'(i) are calculated recursively. μ is a constant factor or convergence parameter respectively, and lies in the range of $$0<\mu<\frac{1}{10 * R_{x2x2}(0)} \qquad (7)$$

$R_{x2x2}$ denotes an autocorrelation function of the speech signal x2(i) at position 0. An extremely advantageous value range of μ is in the present illustrative embodiment $1.5<\mu<3$.

The delay estimates T1'(i) may also be non-integer values i.e. non-integer multiples of a sampling interval. A function block 14 rounds the delay estimates T1'(i) to integer delay values T1(i) by which the delay element 4 is set. The rounding operation by function block 14 is necessary, because values of the speech signal x1(i) to be delayed by the delay element 4 are available only at the respective sampling instants.

The function unit 10 further includes a function block 15 which forms the speech signal estimates $x1_{int}(i)$ according to $$x1_{int}(i)=x1(i+T1(i))+0,5*[T1'(i)-T1(i)]*[x1(+T1(i)+1))-x1(i+T1(i)-1)] \qquad (8)$$

by interpolating three adjacent sample values x1(i+T1(i)−1), x1(i+T1(i)) and x1(i+T1(i)+1) of the speech signal x1. A function block 15 is thus in the position to form or interpolate respectively, a value of the speech signal x1 at sampling instant i+T1(i) i.e. at an instant between two sampling instants via the speech signal estimate $x1_{int}(i)$ in the program cycle i. The described interpolation by function block 15 may be replaced by function block 15 performing a low-pass filtering of the sample values x1(i) for an interpolation of values between the sampling instants.

If the delayed sample values of the speech signal x1(i), which are available on the output of the delay element 4, were used for determining the error values $e_{12}(i)$ instead of the speech signal estimates $x1_{int}(i)$, as this is known from "IEEE Transactions on Acoustics, Speech, and Signal Processing, Vol. ASSP-29, No. 3, June 1981, pp. 582–587", the delay values T1(i) by which the delay element 4 is set would no longer converge if error values $e_{12}(i)=0$ were reached. There would be strong variations of the rounded delay values T1(i). They would vary between two delay values during one sampling interval. The appropriate real time delay between the speech signal components, which is determined by the different paths from the speaker to the microphones M1 and M2, would then lie between these two delay values. In the present illustrative embodiment such variations are avoided in that for the formation of the error values, speech signal estimates $x1_{int}(i)$ are used as a result of which the values of the speech signal x1(i) are available also for delays by non-integer multiples of a sampling interval, thus also at instants unequal to the sampling instant i of the speech signal x1(i).

The function block 12 used for smoothing the gradient estimate sgrad(i) yields an improved calculation of the delay estimates T1'(i).

The control device 3 adapts the delay estimates T1'(i) or the delay values T1(i) respectively, so that from one program cycle to the next the square or power respectively, of the error values $e_{12}(i)$ is diminished. The convergence of T1'(i), T1(i) respectively, is thus ensured.

Figure 3:
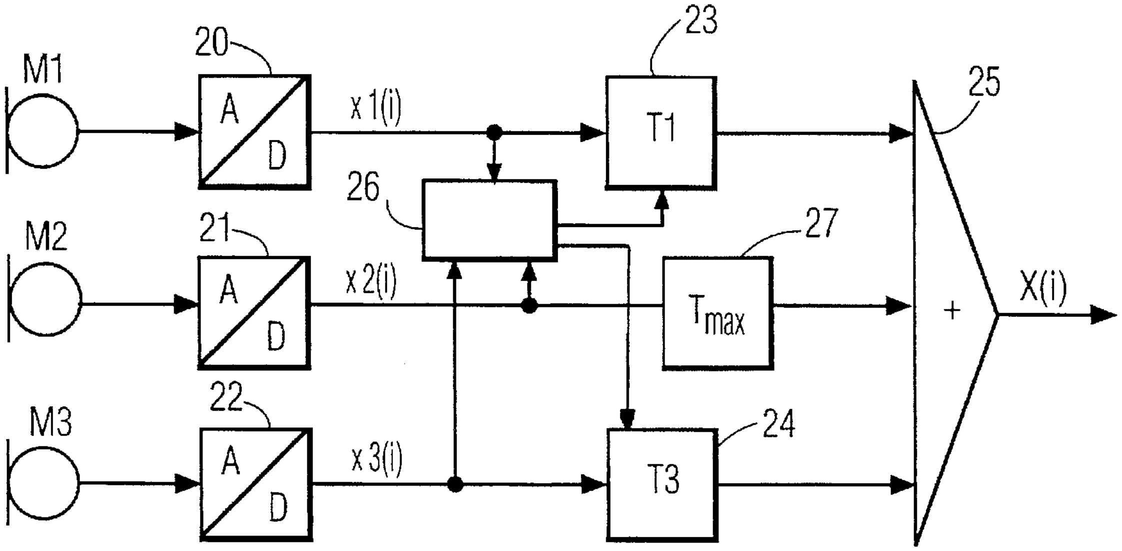
FIG. 3 shows a speech processor for three speech signals.

FIG. 3 shows a speech processor comprising three microphones M1, M2 and M3 for supplying microphone or speech signals respectively, which works, in principle, in similar fashion to the speech processor shown in FIG. 1. The microphone signals are applied to analog-to-digital converters 20, 21, 22 which produce digitized and thus sampled speech signals x1(i), x2(i) and x3(i), which signals consist of speech and noise signal components. The speech signals x1(i) and x3(i) are applied to adjustable delay elements 23 and 24. Similar to FIG. 1, the speech signal x2(i) is applied to a delay element 27 which has a fixed delay time $T_{max}$. The output values of the delay elements 23, 24 and 27 are added together by an adder 25 to form the sum signal X(i). A control device 26 evaluates the sample values of the speech signals x1(i), x2(i) and x3(i) and derives from these sample values, in analogy with the mode of operation of the control device 3 shown in FIGS. 1 and 2, rounded integer delay values T1(i) and T3(i), which correspond to integer multiples of a sampling interval of the sampled speech signals x1(i), x2(i) and x3(i) and by which the delay elements 23 and 24 are set, so that an extension is possible from two to three microphone or speech signals to be processed.

Figure 4:
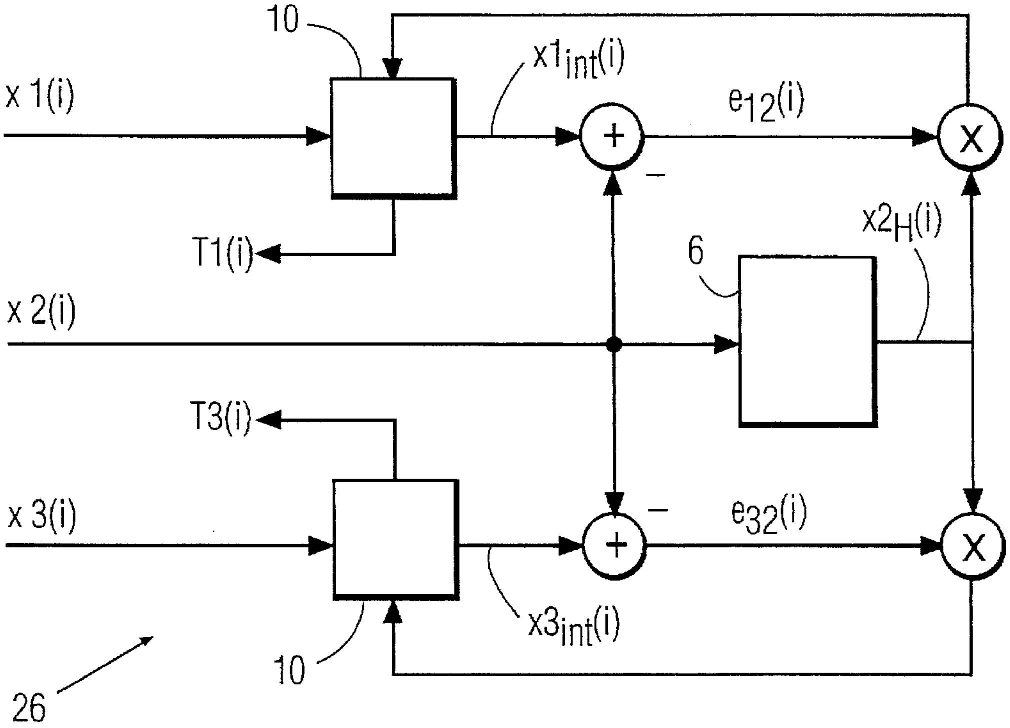
FIGS. 4 and 5 show block circuit diagrams comprising control devices for setting time shifts between the three speech signals shown in FIG. 3, FIGS. 6 and 7 show a block circuit diagram and a flow chart for determining the signal-to-noise ratio of a speech signal.

FIG. 4 shows a first embodiment for a control device 26 shown in FIG. 3. Two function units 10 are provided whose structure is equal to that of the function unit 10 of FIG. 2 and which are used for setting the delay elements 23 and 24 with the rounded time delay values T1(i) and T3(i).

The upper function unit 10 produces speech signal estimates $x1_{int}(i)$. The lower function unit 10 produces speech signal estimates $x3_{int}(i)$. Error values $e_{12}(i)$ and $e_{32}(i)$ are formed from a difference $x1_{int}(i)-x2(i)$ and from a difference $x3_{int}(i)-x2(i)$.

Here too a digital filter 6 is included which has already been described with respect to the embodiment of FIG. 2 and which filter is used for receiving the sample values x2(i) and for producing values $x2_H(i)$ which are generated via a Hilbert transform from the sample values x2(i). The values $x2_H(i)$ are multiplied, on the one hand, by the error values $e_{12}(i)$ and, on the other, by the error values $e_{32}(i)$. The first product $x2_H(i)*e_{12}(i)$ is applied to the upper function unit 10 while the second product $x2_H(i)*e_{32}(i)$ is applied to the lower function unit 10. The arrangement of the function blocks 7 and 8, the buffer 9 and the switch 11 is made in analogy with FIG. 2 and is not shown in FIG. 4 for clarity.

Figure 5:
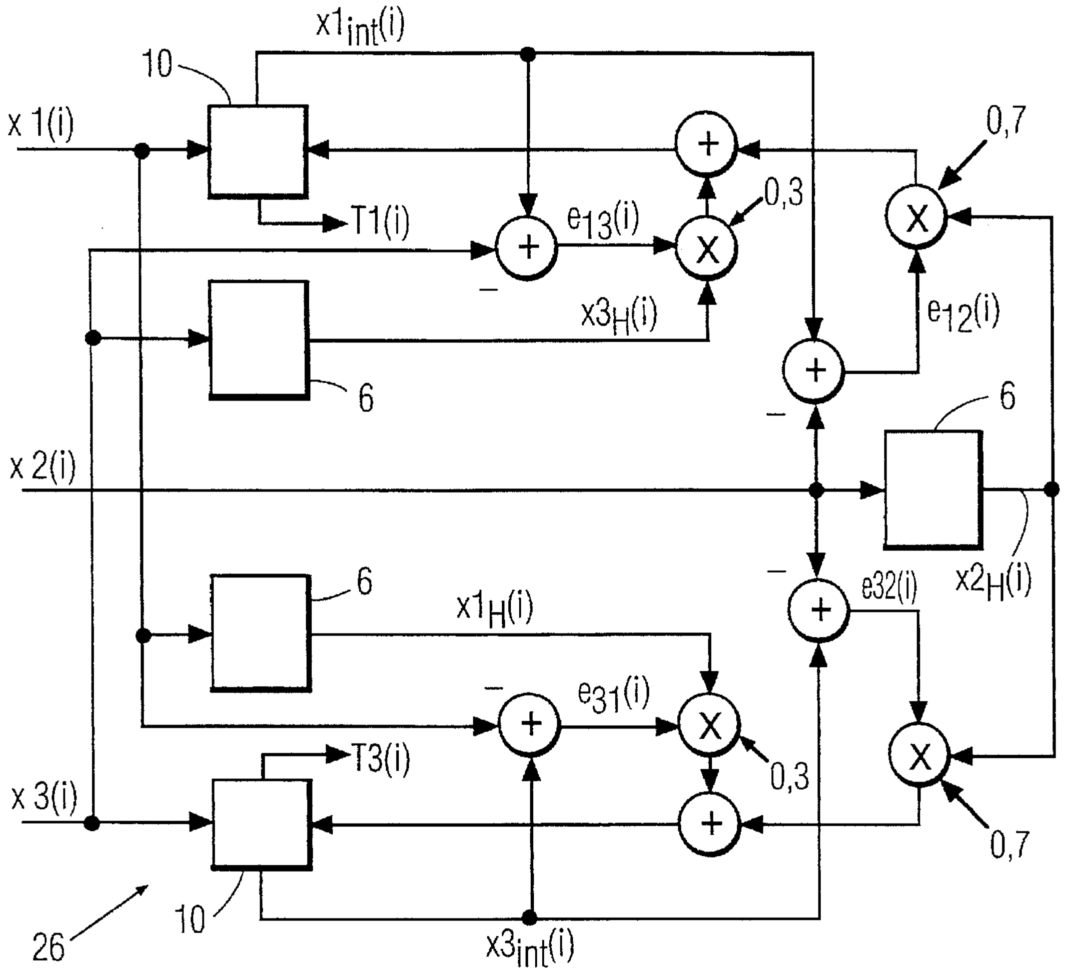

An extended version compared with the version of the control device 26 shown in FIG. 4 is shown in FIG. 5. Contrary to FIG. 4, not only a single digital filter 6, but three digital filter 6 are included. They form the values $x1_H(i)$, $x2_H(i)$ and $x3_H(i)$ from the speech signal sample values x1(i), x2(i) and x3(i) via a Hilbert transform.

In the upper half of the block diagram shown in FIG. 5, error values $e_{13}(i)$ are formed from the difference $x1_{int}(i)-x2(i)$ which error values have an effect on a first product $0.3*e_{13}(i)*x3_H(i)$. A second product is the result from $0.7*e_{12}(i)*x2_H(i)$. The two products correspond to weighted gradient estimates of the squared error values $e_{13}(i)$ and $e_{12}(i)$. The sum of the first and second products and thus a linear combination of the weighted gradient estimates is applied to the upper function unit 10.

Analogously, error values $e_{31}(i)$ and $e_{32}(i)$ are formed in the lower half of the block diagram shown in FIG. 5. The error values $e_{31}(i)$ are formed from the difference $x3_{int}(i)-x1(i)$. The error values $e_{32}(i)$ are formed from the difference $x3_{int}(i)-x2(i)$. A third product $0.3*e_{31}(i)*x1_H(i)$ and a fourth product $0.7*e_{32}(i)*x2_H(i)$ are added together and the resulting sum is applied to the lower function unit 10.

For the speech processor shown in FIG. 3, which comprises a control device shown in FIG. 4 or FIG. 5, it is possible to generate an improved sum signal X(i) compared with a sum signal realised with the two-microphone speech processor shown in FIG. 1. The signal-to-noise ratio and thus the speech quality of the sum signal X(i) of the speech processor shown in FIG. 3 is further enhanced compared with the sum signal X(i) generated by the speech processor shown in FIG. 1. The control device shown in FIG. 5 compared with the control device shown in FIG. 4 has enhanced stability when used in the speech processor shown in FIG. 3.

Means (cf. function blocks 7 and 8, buffer 9 and switch 11 in FIG. 2) which cause a dependence of the speech processing on estimates SNR(i) for one of the microphone signals x1(i), x2(i) or x3(i) have been omitted both in FIG. 4 and in FIG. 5 for clarity. The normalization of products of error values and output values of the digital filter which performs the Hilbert transform of the power of an associated microphone signal (see $1/P_{x2}(i)$ in FIG. 2) has been omitted for clarity too. The extension of the control devices 26 according to FIGS. 4 and 5 by these two technical features is evident from their realisation in the control device 3 shown in FIG. 2.

To improve the speech quality of the sum signals X(i) on the output of the adders 5 and 25 in FIG. 1 and FIG. 3, the invention may be embodied in such a way that the delay estimates T1'(i) and T3'(i) (they are, for example, floating point notations) for forming the delay values T1(i) and T3(i) are not rounded to values that correspond to an integer multiple of a sampling interval (here: integer numbers), but to values that correspond to a multiple of a fraction of a sampling interval. Especially a rounding of the delay estimates to multiples of a value that corresponds to one-quarter or one-half of a sampling interval is advantageous. In this manner the resolution of the delay values is increased which can thus be set more accurately, so that also the speech quality of the sum signals X(i) is further enhanced because delay differences from the speech source generating the speech signal components to the microphones M1, M2 and M3 can be equalized more accurately. When a speech signal is delayed by a multiple of a fraction of a sampling interval, speech signal sample values are interpolated or low-pass filtered to generate speech signal values that lie between two speech signal sample values. The interpolation or low-pass filtering may be integrated more specifically with the delay means 4, 23 and 24.

Figure 6:
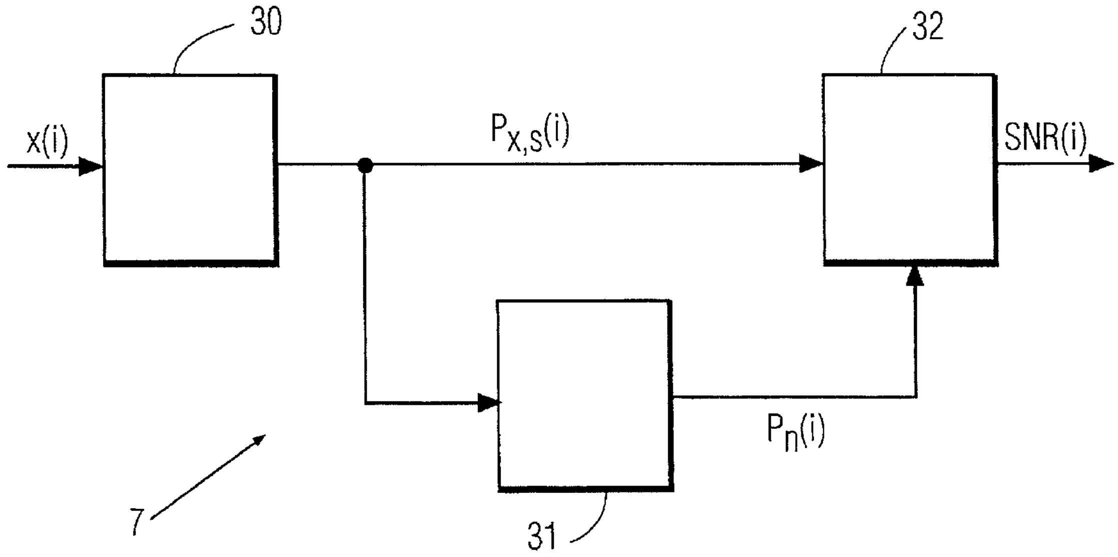
Figure 7:
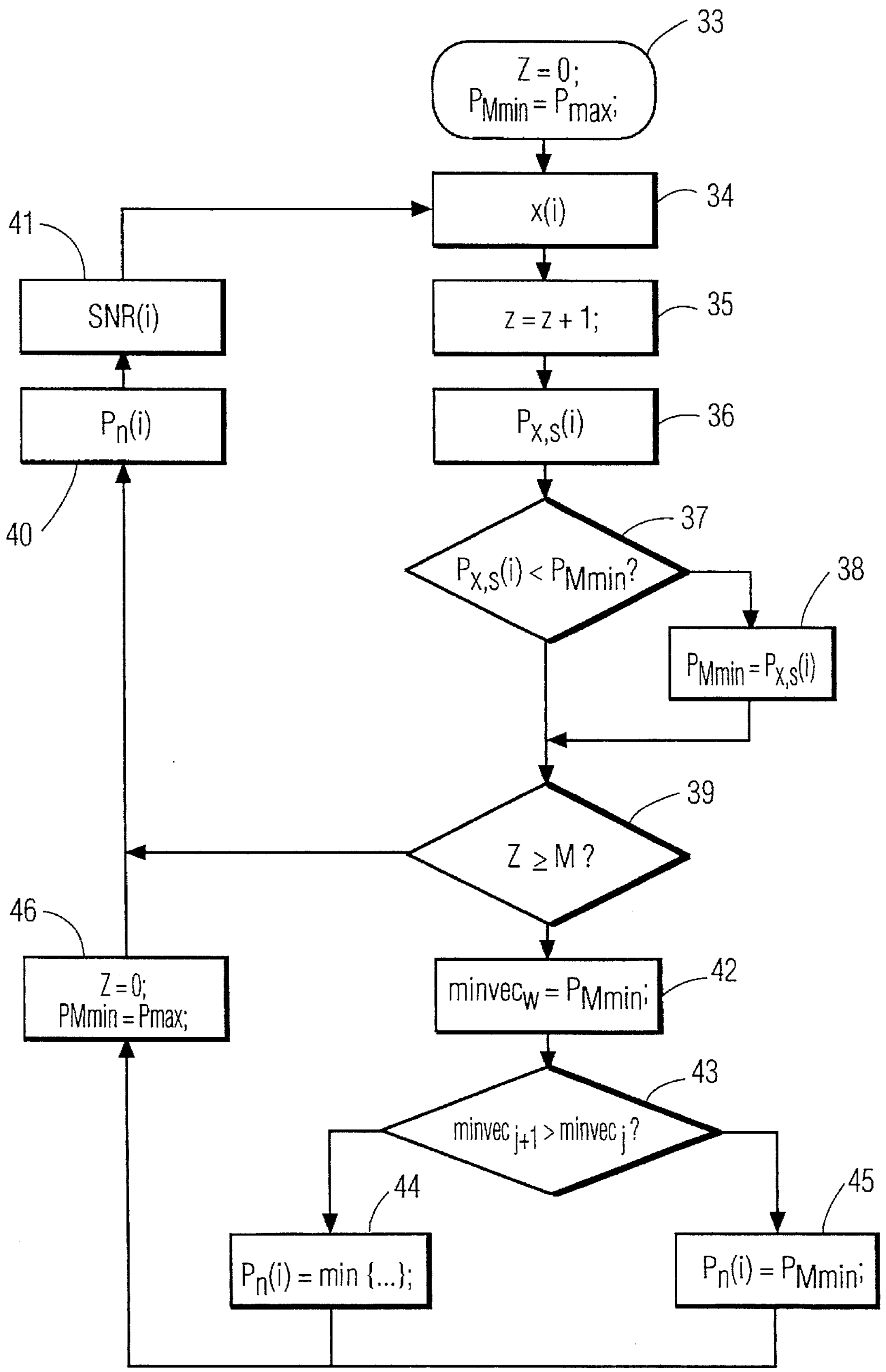

With reference to FIGS. 6 and 7 the scheme will be explained according to which the function block 7 determines the associated estimates SNR(i) of the signal-to-noise ratio i.e. of the ratio of the power of the speech signal components to the power of the noise signal components from a sampled speech signal X(i) which comprises noise and speech signal components. The sample values x2(i) in FIG. 2 correspond to the sample values x(i). In FIG. 6 the function block 7 is shown via a block circuit diagram. A function block 30 is used for forming power values $P_x(i)$ of the sample values x(i) by squaring the sample values. Furthermore, the function block 30 provides a smoothing of these power values $P_x(i)$. The thus smoothed power values $P_{x,s}(i)$ are applied both to the function block 31 and to the function block 32. The function block 31 continuously determines estimates $P_n(i)$ for estimating the power of the noise signal component of the sample values x(i), i.e. the power of the noise signal components of the sample values x(i) is determined. Function block 32 continuously determines estimates SNR(i) of the signal-to-noise ratio of the sample values x(i) from the smoothed power values $P_{x,s}(i)$ and the estimates $P_n(i)$.

FIG. 7 shows a flow chart further explaining the operation of the function block 7. With reference to the flow chart it becomes clear how estimates SNR(i) of the corresponding signal-to-noise ratio are formed from the sample values x(i) of the speech signal x by a computer program. In an initializing block 33, at the beginning of the program described with reference to FIG. 7, a counter variable Z is set to 0 and a variable $P_{Mmin}$ is set to a value $P_{max}$. $P_{max}$ is selected so large as to let the smoothed power values $P_{x,s}(i)$ always be smaller than $P_{max}$. $P_{max}$ can be set, for example, to the maximum count which can be represented of a counter used for realising the program. In a block 34 a new sample value x(i) is written. In block 35 a counter variable Z is incremented by unity after which in block 36 a new smoothed power value $P_{x,s}(i)$ is formed. This smoothed power value results from the fact that first by $$P_x(i)=Px(i-1)+x^2(i)-x^2(i-N) \tag{1}$$

a short-time power value $P_x(i)$ is formed and then by $$P_{x,s}(i)=\alpha*P_{x,s}(i-1)+(1-\alpha)*P_x(i) \tag{2}$$

a new smoothed power value is formed. Formula (1) is instrumental in determining a short-time power value $P_x(i)$ of a group of N successive sample values x(i). N is here, for example, equal to 128. The value $\alpha$ of equation (2) lies between 0.95 and 0.98. The smoothed power values $P_{x,s}(i)$ can also be determined by only using equation (2), while then certainly the value $\alpha$ is to be enhanced to the value 0.99 and $P_x(i)$ is to be replaced by x2(i).

Via a program branch 37 there is then inquired whether the just determined smoothed power value $P_{x,s}(i)$ is smaller than $P_{Mmin}$. If a positive response is obtained, i.e. $P_{x,s}(i)$ is smaller than $P_{Mmin}$, block 38 will set $P_{Mmin}$ to the value $P_{x,s}(i)$. If the inquiry of program branch 37 obtains a negative response, block 38 will be skipped. Therefore, after M program cycles $P_{Mmin}$ exhibits the minimum of M smoothed power values $P_{x,s}$. Subsequently, with the program branch 39, there is the inquiry whether the counter variable Z has a value larger than or equal to a value M. In this manner there is established whether M smoothed power values have already been processed.

If the response to the inquiry of program branch 39 is negative, i.e. M smoothed power values have not yet been processed, the program is continued with block 40. At that point a preliminary estimate $P_n(i)$ of the noise signal power of the speech signal x is determined by $$P_n(i)=\min\{P_{x,s}(i), P_n(i)\} \quad (3)$$

This operation ensures that the preliminary estimate $P_n(i)$ cannot be larger than the current smoothed power value $P_{x,s}(i)$. Thereafter, in block 41, a current estimate SNR(i) of the signal-to-noise ratio of the speech signal x(i) is determined according to the formula $$SNR(i)=[P_{x,s}(i)-\min\{c*P_n(i), P_{x,s}(i)\}]/[c*P_n(i)] \quad (4)$$

Normally, the product $c*P_n(i)$ is used to estimate the current power of the noise signal component, and the difference $P_{x,s}(i)-c*P_n(i)$ is used for estimating the current power of the speech signal component of the speech signal x(i). The current power of the speech signal is estimated by the smoothed power value $P_{x,s}(i)$. The weighting with a scaling factor c avoids that $P_n(i)$ forms too small an estimate for the noise signal power. The scaling factor c lies typically in the range from 1.3 to 2. The minimization block 41 and equation (4) respectively, ensure that the non-logarithmic signal-to-noise ratio SNR(i) is also positive if in an exceptional case $c*P_n(i)$ exceeds $P_{x,s}(i)$. In that case the power of the noise signal component of the speech signal is set equal to the power of the speech signal estimated by $P_{x,s}(i)$. The power of the speech signal component estimated by Px,s–$P_{x,s}(i)$ is then equal to zero as is the non-logarithmic signal-to-noise ratio. After the calculation of the estimate SNR(i), the program is continued with block 34 where a new speech signal sample value x(i) is written.

If the response to the inquiry of the program branch 39 is positive, i.e. M smoothed sample values $P_{x,s}(i)$ have been processed, the components of a vector minvec having dimension W are updated in block 42 by $$\begin{aligned} &minvec_1 = minvec_2; \\ &minvec_2 = minvec_3; \\ &\quad\vdots \\ &minvec_{W-1} = minvec_W; \\ &minvec_W = P_{Mmin}; \end{aligned} \quad (5)$$

Subsequently, program branch 43 inquires whether the components $minvec_1$ to $minvec_w$ rise with a rising vector index, i.e. whether the following holds $$minvec_{j+1}>minvec_j \text{ for } 1\leqq j\leqq W-1 \quad (6)$$

If the enquiry of program branch 43 obtains a negative response, i.e. the W minima determined most recently and found in the components of the vector minvec do not rise monotonously, block 44 determines according to $$P_n(i)=\min\{minvec_w, minve_{w-1}, \ldots, minvec_1\} \quad (7)$$

the preliminary estimate $P_n(i)$ of the noise signal power from the minima of the components of the vector minvec i.e. from the minimum of the last L=W*M successive smoothed power values $P_{x,s}(i)$. If the response to the enquiry made by program branch 43 is positive i.e. if there is a monotonous increase of the most recently determined W minima found in the components of the vector minvec, $P_n(i)$ is set equal to $P_{Mmin}$ in block 45, so that the noise signal component estimate is adapted more rapidly, because $P_n(i)$ is determined based upon the minimum of the last (M<L) value. Subsequently, in block 46, the counter variable Z is again set to 0 and $P_{Mmin}$ again obtains the value $P_{max}$.

The program described above combines M successive smoothed $P_{x,s}(i)$ sample values x(i) of the speech signal x to a sub-group. Within such a sub-group, the minimum of the smoothed power values $P_{x,s}(i)$ is determined by the operations carried out by program branch 37 and block 38. The most recently determined W minima are stored in the components of the vector minvec. If the last W minima do not increase monotonously (see program branch 43), block 44 determines a preliminary estimate $P_n(i)$ of the power of the noise signal component from the minimum of the minirod of the last W sub-groups i.e. from the minimum of one group. For forming a group having L=W*M successive smoothed power values $P_{x,s}(i)$, W successive sub-groups are combined. The groups having L respective values form gapless sequences and overlap by L-M smoothed powers $P_{x,s}(i)$.

For the case where the minima of W successive sub-groups increase monotonously (see program branch 43), block 45 uses for estimating the current estimate $P_n(i)$ of the power of the noise signal component the minimum of the last sub-group that has M smoothed power values $P_{x,s}(i)$. The period of time in which monotonously increasing smoothed power values $P_{x,s}(i)$ also cause the estimates SNR(i) to change is thus shortened.

Figure 8:
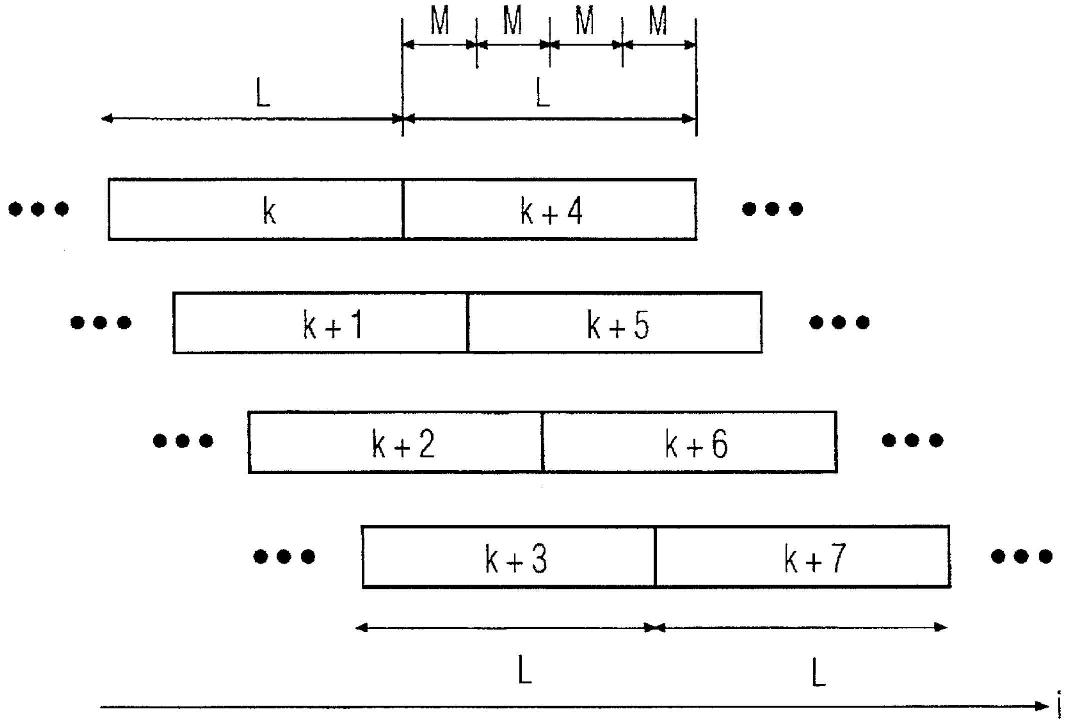
FIG. 8 shows a subdivision of smoothed power values of a speech signal into groups and sub-groups.

FIG. 8 clarifies how the smoothed power values $P_{x,s}$ are combined to groups and sub-groups. Each time M smoothed power values $P_{x,s}(i)$ which are available at sampling instants i are combined to a sub-group. The sub-groups are adjacent. For each sub-group is determined the minimum of the smoothed power values $P_{x,s}(i)$. W respective sub-group minima are stored in the vector minvec. As a rule i.e. in the case of non-monotonously increasing W sub-group minima, W sub-groups are combined to a group having L=W*M smoothed power values $P_{x,s}(i)$. After M respective smoothed powers $P_{x,s}(i)$, the value $P_n(i)$ used for estimating the noise signal power is determined from the minimum of the last W sub-group minima or the last L smoothed power values $P_{x,s}(i)$. FIG. 8 shows eight groups having L respective sample values x(i), which contain W=4 respective sub-groups of M smoothed power values $P_{x,s}(i)$. The eight groups partly overlap. In this manner two successive groups contain each L-M equal smoothed power values $P_{x,s}(i)$. In this manner a good compromise is reached between the required calculation circuitry and expense and the delay time in that an estimate $P_n(i)$ of the noise signal power is updated for an updating of an estimate SNR(i) of the signal-to-noise ratio. A realisation with adjacent i.e. non-overlapping groups is also conceivable. With reduced calculation circuitry and expense, however, the time interval between two estimates SNR(i) is then enlarged, so that the reaction time to changing SNR of the speech signal x(i) is lengthened.

The described speech processor thus includes an estimator which is suitable for continuously forming estimates SNR(i) of the signal-to-noise ratio of noisy speech signals x(i). Especially, no speech pauses are necessary for an estimation of the noise signal power. The described estimator utilizes the special period of time of smoothed power values of the speech signal x(i), which period of time is featured by peaks and intermittent ranges having smaller smoothed power values $P_{x,s}(i)$, whose prolongation depends on the speech source i.e. on the speaker in question. The ranges between the peaks are then used for estimating the power of the noise signal component. The groups of L smoothed power values $P_{x,s}(i)$ are to follow each other without a gap i.e. they are to be either adjacent or overlapping. Furthermore, there must be ensured that at least one value of a range lying between two peaks can be measured with the smaller smoothed power values $P_{x,s}(i)$ of each group i.e. each group is to contain so many smoothed power values $P_{x,s}(i)$ that at least all the values belonging to a particular peak can be measured. Since the peaks prolonged most in time can be estimated by the phonemes of a speech signal that can be prolonged most in time, i.e. the vowels, the number L describing the group size can be derived therefrom. For a sampling rate of the speech signal of 8 kHz, a suitable value of L lies in the range from 3000 to 8000. An advantageous value for W is 4. For such a dimensioning there is good compromise between calculation circuitry and expense and reaction speed of the function block 7.

Figure 9:
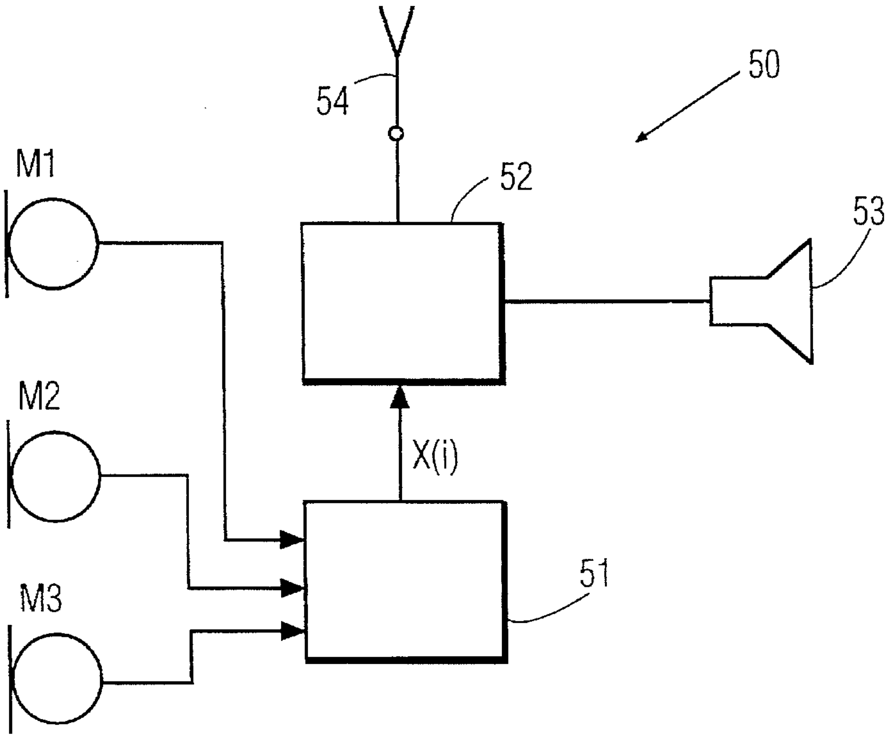
FIG. 9 shows a mobile radio terminal comprising a speech processor shown in FIGS. 1 to 8.

FIG. 9 shows an implementation of the speech processor shown in FIG. 3 in a mobile radio terminal 50. The speech processing means 20 to 26 are combined in a single function block 51 which forms the sum signal value X(i) from the microphone and speech signals respectively, produced by the microphones M1, M2 and M3. The microphones M1, M2 and M3 advantageously have a distance from 10 to 60 cm, so that in a so-called fading environment (for example, motor car, office) the noise signal components of the speech signals produced by the microphones M1, M2 and M3 are largely uncorrelated. This also applies to the use of only two microphones such as shown in FIG. 1. A function block 52 processing the sum signal values X(i) combines all further means of the mobile radio terminal 50 for receiving, processing and transmitting signals which are used for communication with a base station (not shown), while transmission and reception of signals is effected via an aerial 54 coupled to the function block 52. Furthermore there is provided a loudspeaker 53 coupled to the function block 52. The acoustic communication of a user (speaker, listener) with the mobile radio terminal 50 is effected via the microphones M1 to M3 and the loudspeaker 53, which form part of a hands-free facility integrated with the mobile radio terminal 50. The use of such a mobile radio terminal 50 is especially advantageous in private cars, because it is there that the hands-free operation via the mobile radio terminal is disturbed especially by engine or driving noise.

I claim:

1. Mobile radio terminal comprising a speech processor provided for processing a first and at least a further speech signal consisting of noise and speech signal components and available as sample values, comprising delay means for delaying the sampled further speech signal, comprising control means for forming gradient estimates by multiplying error values for two speech signals by the output values of a digital filter, which filter causes a 90° phase shift to occur and is used for filtering one of the two speech signals, for recursively determining delay estimates from the gradient estimates, while the delay values used for setting the delay means are formed from the delay estimates via a rounding operation, and for forming at least one respective error value for a specific sampling instant from the difference between a speech signal estimate which estimate is used for estimating the further speech signal at an instant shifted in time by the delay estimate relative to the specific sampling instant, and is formed by interpolating sample values of the further speech signal and the sample value of another one of the speech signals to be processed at the specific sampling instant, and in that an adder device is provided for adding together the mutually time-shifted speech signals.

2. Mobile radio terminal as claimed in claim 1, characterized in that the digital filter is a digital Hilbert transform.

3. Mobile radio terminal as claimed in claim 2, characterized in that smoothing means are provided for smoothing the gradient estimates.

4. Mobile radio terminal as claimed in claim 1, characterized in that the speech processor is provided for processing three speech signals.

5. Mobile radio terminal as claimed in claim 1, characterized in that a linear combination of error values is used for determining a delay estimate for the further speech signal.

6. Mobile radio terminal as claimed in claim 1, characterized in that the delay means are provided for delaying the first speech signal by a fixed delay time.

7. Mobile radio terminal as claimed in claim 1, characterized in that the speech processor is integrated with a hands-free facility.

8. Speech signal processor for processing a first and at least a further speech signal consisting of noise and speech signal components and available as sample values, comprising delay means for delaying the sampled further speech signal, comprising control means for forming gradient estimates by multiplying error values for two speech signals by the output values of a digital filter, which filter causes a 90° phase shift to occur and is used for filtering one of the two speech signals, for recursively determining delay estimates from the gradient estimates, while the delay values used for setting the delay means are formed from the delay estimates via a rounding operation, and for forming at least one respective error value for a specific sampling instant from the difference between a speech signal estimate which estimate is used for estimating the further speech signal at an instant shifted in time by the delay estimate relative to the specific sampling instant, and is formed by interpolating sample values of the further speech signal and the sample value of another one of the speech signals to be processed at the specific sampling instant, and in that an adder device is provided for adding together the mutually time-shifted speech signals.

* * * * *